(12) United States Patent
Dal Lago et al.

(10) Patent No.: US 11,615,550 B2
(45) Date of Patent: Mar. 28, 2023

(54) MAPPING METHOD AND SYSTEM FOR MAPPING A REAL ENVIRONMENT

(71) Applicant: SR LABS S.R.L., Milan (IT)

(72) Inventors: Gianluca Dal Lago, Milan (IT); Roberto Delfiore, Milan (IT)

(73) Assignee: SR LABS S.R.L., Milan (IT)

( * ) Notice: Subject to any disclaimer, the term of this patent is extended or adjusted under 35 U.S.C. 154(b) by 0 days.

(21) Appl. No.: 16/956,813

(22) PCT Filed: Dec. 21, 2018

(86) PCT No.: PCT/IB2018/060531
§ 371 (c)(1),
(2) Date: Jun. 22, 2020

(87) PCT Pub. No.: WO2019/123422
PCT Pub. Date: Jun. 27, 2019

(65) Prior Publication Data
US 2021/0065396 A1    Mar. 4, 2021

(30) Foreign Application Priority Data
Dec. 22, 2017  (IT) .......................... 102017000149372

(51) Int. Cl.
*G06T 7/70*    (2017.01)
*G06F 3/01*    (2006.01)

(52) U.S. Cl.
CPC ................ *G06T 7/70* (2017.01); *G06F 3/013* (2013.01); *G06T 2207/10016* (2013.01); *G06T 2207/30204* (2013.01)

(58) Field of Classification Search
CPC . G06T 2207/10016; G06T 2207/30204; G06T 7/70; G06F 3/013; G06F 3/011
See application file for complete search history.

(56) References Cited

U.S. PATENT DOCUMENTS

2012/0269446 A1 * 10/2012 Nakajima ............ G06V 10/422
382/201

FOREIGN PATENT DOCUMENTS

| EP | 2499963 A1 * | 9/2012 | ............ G06F 3/013 |
| EP | 2499963 A1 | 9/2012 | |

(Continued)

OTHER PUBLICATIONS

Kato et al., Marker Tracking and HMD Calibration for A Video-Based Augmented Reality Conferencing System, Augmented Reality, 1999, (IWAR '99), proceedings, $2^{nd}$ IEEE and ACM International Workshop on San Francisco, CA, Oct. 20-21, 1999, Jan. 1, 1999, pp. 85-94.

(Continued)

*Primary Examiner* — Marcos L Torres
(74) *Attorney, Agent, or Firm* — McCarter & English, LLP

(57) ABSTRACT

A mapping method is disclosed that includes (i) memorizing at least one reference image of an environment to be mapped containing a specific arrangement of a plurality of markers organized in cells; wherein each cell is identified by a marker or by a combination of markers; the plurality of markers comprising at least a number of different types of markers equal to a type-number; (ii) detecting, by a moving video camera, a video sequence wherein the environment to be mapped is, at least in part, framed; (iii) identifying in at least one frame of the video sequence one or more cells being part of the specific arrangement of markers of the reference image; and (iv) calculating, on the basis of the data regarding the identified cells, at least one homography for the perspective transformation of the coordinates acquired in the video sequence into coordinates in the reference image and vice versa.

22 Claims, 4 Drawing Sheets

(56) References Cited

FOREIGN PATENT DOCUMENTS

| WO | WO 2010/083853 A1 | 7/2010 | | |
| WO | WO-2010083853 A1 * | 7/2010 | ............. | A61B 3/113 |
| WO | WO 2017/153355 A1 | 9/2017 | | |

OTHER PUBLICATIONS

Pagani, et al., Circular Markers for Camera Pose Estimation, Jan. 1, 2011, https://pdfs.semanticscholar.org/d631/a0c263a1cefafc4e6ce0bbbbffd9e81ac01f.pdf.

PCT International Search Report and Written Opinion for PCT/IB2018/060531 dated Feb. 21, 2019.

* cited by examiner

MAPPING METHOD AND SYSTEM FOR MAPPING A REAL ENVIRONMENT

CROSS-REFERENCE TO RELATED APPLICATIONS

This patent application is a 35 U.S.C. § 371 National Stage filing of International Application No. PCT/IB2018/060531 filed on Dec. 21, 2018, which application claims priority from Italian patent application no. 102017000149372 filed on Dec. 22, 2017, the entire disclosure of which is incorporated herein by reference.

TECHNICAL FIELD

The invention relates to a mapping method and system.

In particular, the invention relates to a mapping method and system for mapping at least one real environment to be mapped.

BACKGROUND ART

In different technical fields there is an increasingly strong need to map some real places/elements. The results deriving from the mapping, indeed, are usually used to assess the users' attitude when they are interfaced with these specific places or elements, so as to identify elements of interest in sequences of images in order to determine their position and/or to show items of information concerning them and/or interact with the elements of interest. Some known mapping methods involve mapping the real world starting from acquired images of the real world itself.

However, in order to make the acquisition of the images easy and in order to affect the users' behaviour during the acquisition of the images as least as possible, miniature video cameras are used and built-in in movable and/or wearable devices. The images acquired by so doing are images in motion, which can sometimes be characterized by medium/low quality, scarce definition or imperfect focusing.

A quick and reliable mapping starting from this type of images acquired by moving video cameras is not currently available.

DISCLOSURE OF INVENTION

Therefore, an object of the invention is to provide a mapping method, which allows users to overcome the drawbacks discussed above in a simple and economic fashion, both from a functional point of view and from a constructive point of view. In other words, an object of the invention is to provide a quick mapping method, which, at the same time, is capable of providing reliable data.

In accordance with these objects, the invention relates to a mapping method according to claim 1.

The method according to the invention advantageously ensures a reliable mapping in short times. The use of a specific reference arrangement, in which the markers are organized in cells, allows for the use of markers of different types, even particularly simple ones, thus making the identification in the video sequence reliable and quick despite the fact that the video images are acquired by means of a moving video camera and are sometimes characterized by medium/low quality, scarce definition or imperfect focusing.

Besides, the method according to the invention also allows very large environments to be mapped thanks to the division in cells. Indeed, the method according to the invention allows very large environments to be mapped even if only a portion of the environment of interest is framed.

A further object of the invention is to provide a mapping system for mapping a real environment, which is quick, easy and economic to be manufactured and is capable of providing reliable data.

In accordance with these objects, the invention relates to a mapping system according to claim 11.

BRIEF DESCRIPTION OF THE DRAWINGS

Further features and advantages of the invention will be best understood upon perusal of the following description of a non-limiting embodiment thereof, with reference to the accompanying drawing, wherein.

BEST MODE FOR CARRYING OUT THE INVENTION

Figure 1:
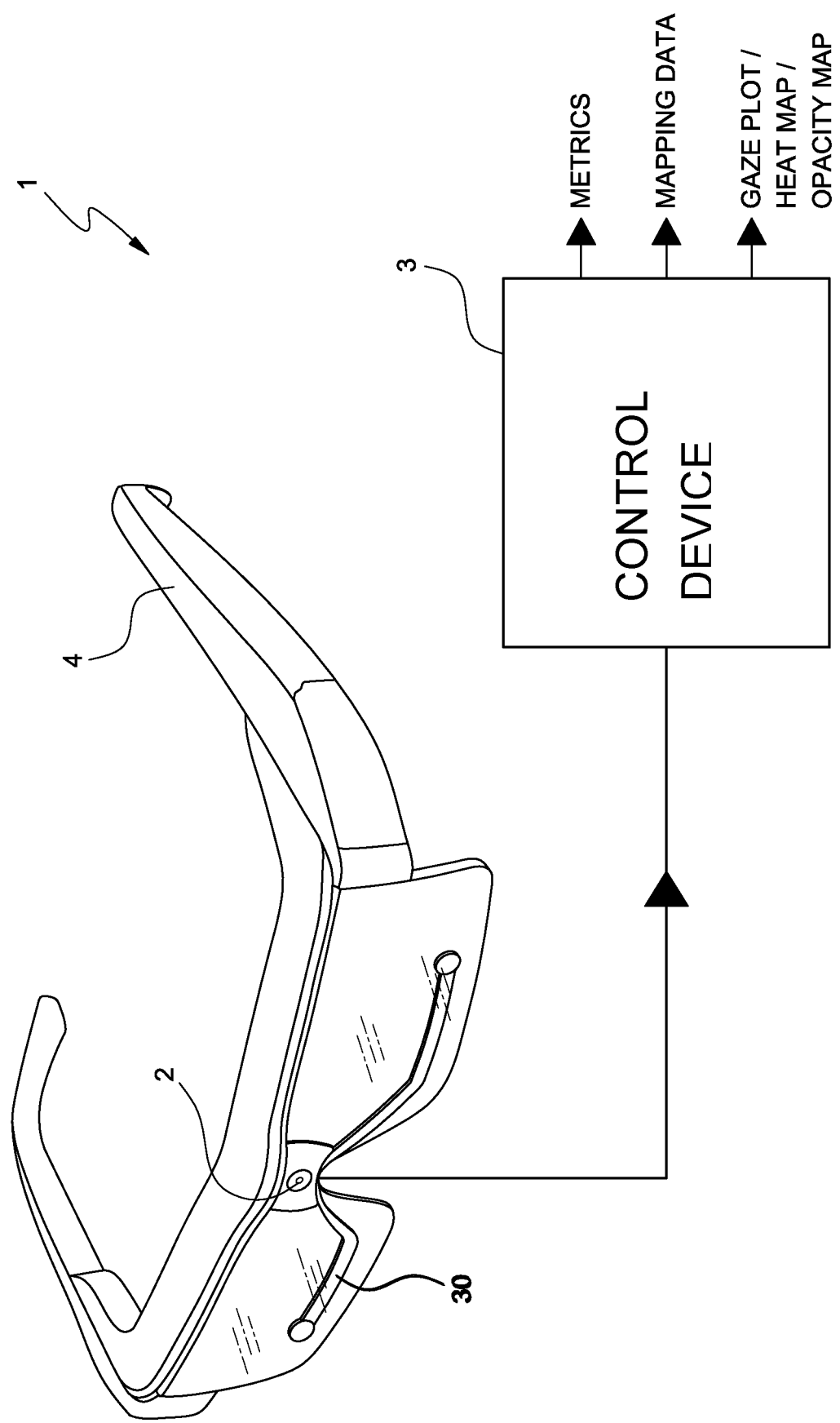
FIG. 1 is a schematic representation of a mapping system according to the invention.

In FIG. 1 number 1 indicates a mapping system for mapping a real environment according to the invention.

Hereinafter reference will be made to a mapping system and method applied to the study of the buying attitudes of a consumer in a supermarket. Obviously, the mapping method and system according to the invention can be used in other applications, such as for example the displaying of items of information concerning particular framed environments or particular areas of interest, or applications of augmented reality, in the retail field, in the industrial field and in the management of warehouses.

The mapping system 1 comprises a video camera 2 and a control device 3 configured to receive the data acquired by the video camera 2 and carry out the mapping.

In the non-limiting embodiment shown and disclosed herein, the video camera 2 is fitted on a pair of glasses 4, so as to acquire a sequence of images in motion concerning what the person is looking at. Since the glasses 4 are a scarcely invasive device, users are not influenced in their approach to the environment and/or to the element to be mapped. According to variants, the video camera is a built-in video camera of a "smart device" (tablet, phone, watch, etc.).

In the non-limiting embodiment shown and disclosed herein, the environment to be mapped is a shelf of a supermarket displaying products that can be bought by consumers.

Figure 2:
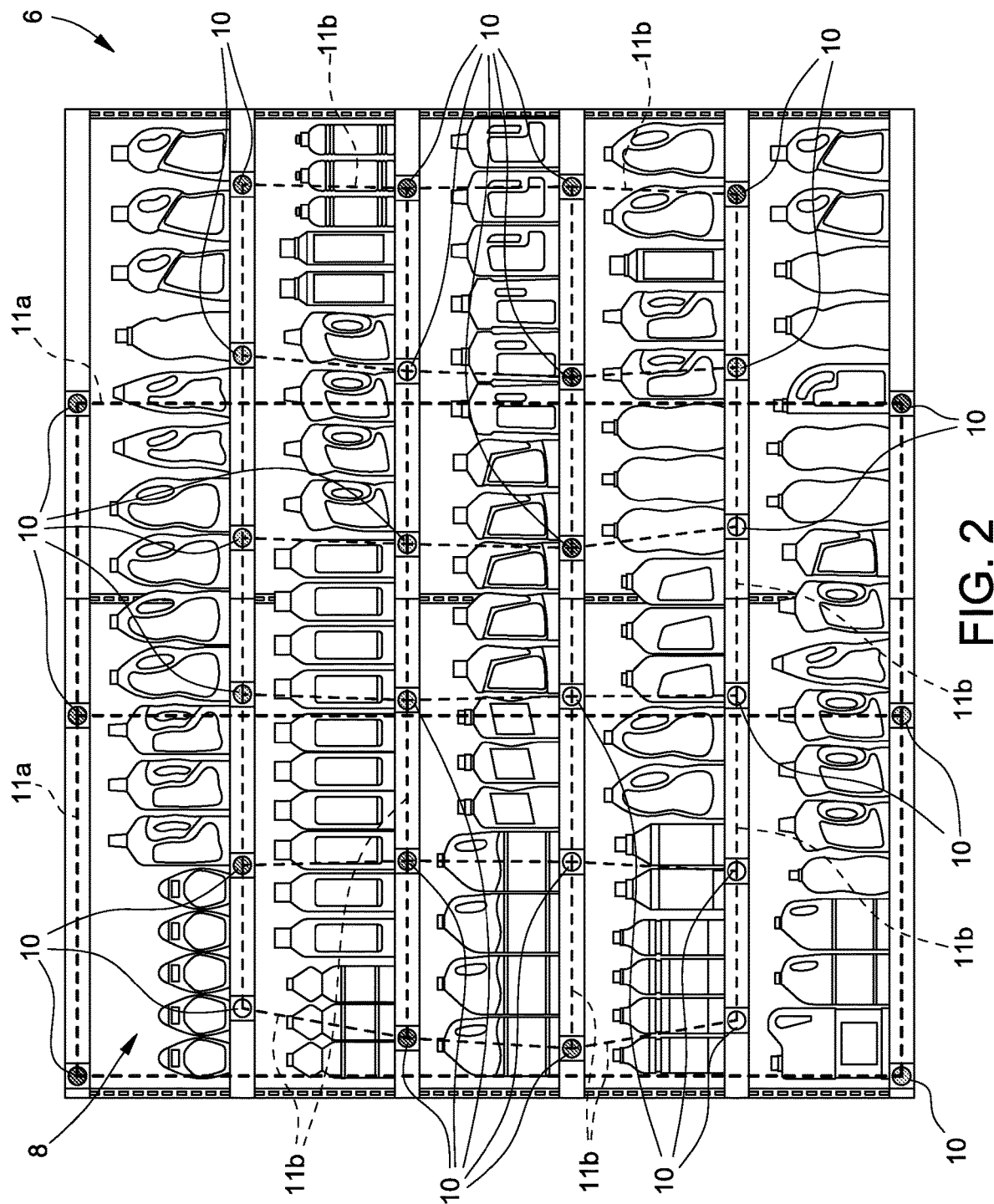
FIG. 2 is a schematic representation of a detail of the system of FIG. 1.

FIG. 2 shows a reference image 6 of an environment to be mapped 8. This reference image 6 is often defined, in the technical field, "snapshot".

The reference image 6 is a preferably high-definition image of the environment to be mapped 8. In the non-limiting embodiment shown and disclosed herein, the reference image 6 is an image showing a substantially front view of the environment to be mapped 8.

As already mentioned above, in the non-limiting embodiment shown and disclosed herein, the environment to be mapped 8 is a shelf of a supermarket.

The environment to be mapped 8 contains a specific arrangement of a plurality of markers 10 organized in cells 11 (shown in FIG. 2 with a broken line). In other words, the markers 10 are properly positioned by a user before going on with the mapping step. As already mentioned above, the markers 10 are arranged so as to define one or more cells 11. In this way, the markers 10 define a sort of coordinate system in the environment to be mapped 8.

The markers 10 are passive markers and do not emit any signal.

Each cell 11, as discussed more in detail below, is identified by a marker 10 or by a combination of markers 10. By combination of markers we mean a specific arrangement of markers, preferably different ones, capable of identifying the cell. In other words, the cell is defined by markers having, for example, a given space arrangement, orientation, etc.

The plurality of markers 10 comprises a number of different types of markers equal to a type-number K.

The type-number K of different types of markers is equal to at least two.

According to a variant which is not shown herein, the type-number K of different types of markers is equal to at least 3.

In the non-limiting embodiment shown and disclosed herein, the type-number K of different types of markers is equal to four. In the non-limiting embodiment shown and disclosed herein, the markers 10 all have a circular shape and have a number of different colours equal to the type-number K.

More precisely, the markers 10 have K different colours.

For example, the markers 10 can be magenta, blue, green and orange. However, in the accompanying FIG. 2, the markers 10 are schematically shown in 4 different shades of the greyscale.

The colours of the markers are preferably classified in terms of space-LAB colour coordinates.

Alternatively, the colour of the markers 10 is recognized in an automatic manner by a suitable colour-classification algorithm.

In the non-limiting embodiment shown and disclosed herein, the markers 10 have a same diameter.

According to a variant which is not shown herein, the markers can have different diameters. For example, some cells can have markers with a greater diameter than the rest of the markers, so that they can easily be detected also at high distances. In this way, some cells can be detected at a given distance and other cells at a different distance. Therefore, the number of large-sized markers can be reduced to a minimum and the visual impact of the user can be maximized.

The markers 10 are preferably arranged on a white background. In this way, the colours chosen for the markers 10 (magenta, blue, green and orange) are more identifiable. Obviously, the background can be different for markers with a different shape and/or different colours.

In the non-limiting embodiment shown and disclosed herein, the cells 11 are defined by four markers 10 arranged at the vertexes of a quadrilateral.

FIG. 2 shows a specific arrangement of the cells 11 (shown by broken lines). In the non-limiting embodiment shown and disclosed herein, some cells 11a can contain other smaller cells 11b. Obviously, the specific arrangement of the cells 11 can change depending on the type of application and/or on the type of environment to be monitored.

For example, the cells 11 can be more or less close to one another relative to the configuration shown in FIG. 2, depending on the needs.

Figure 3:
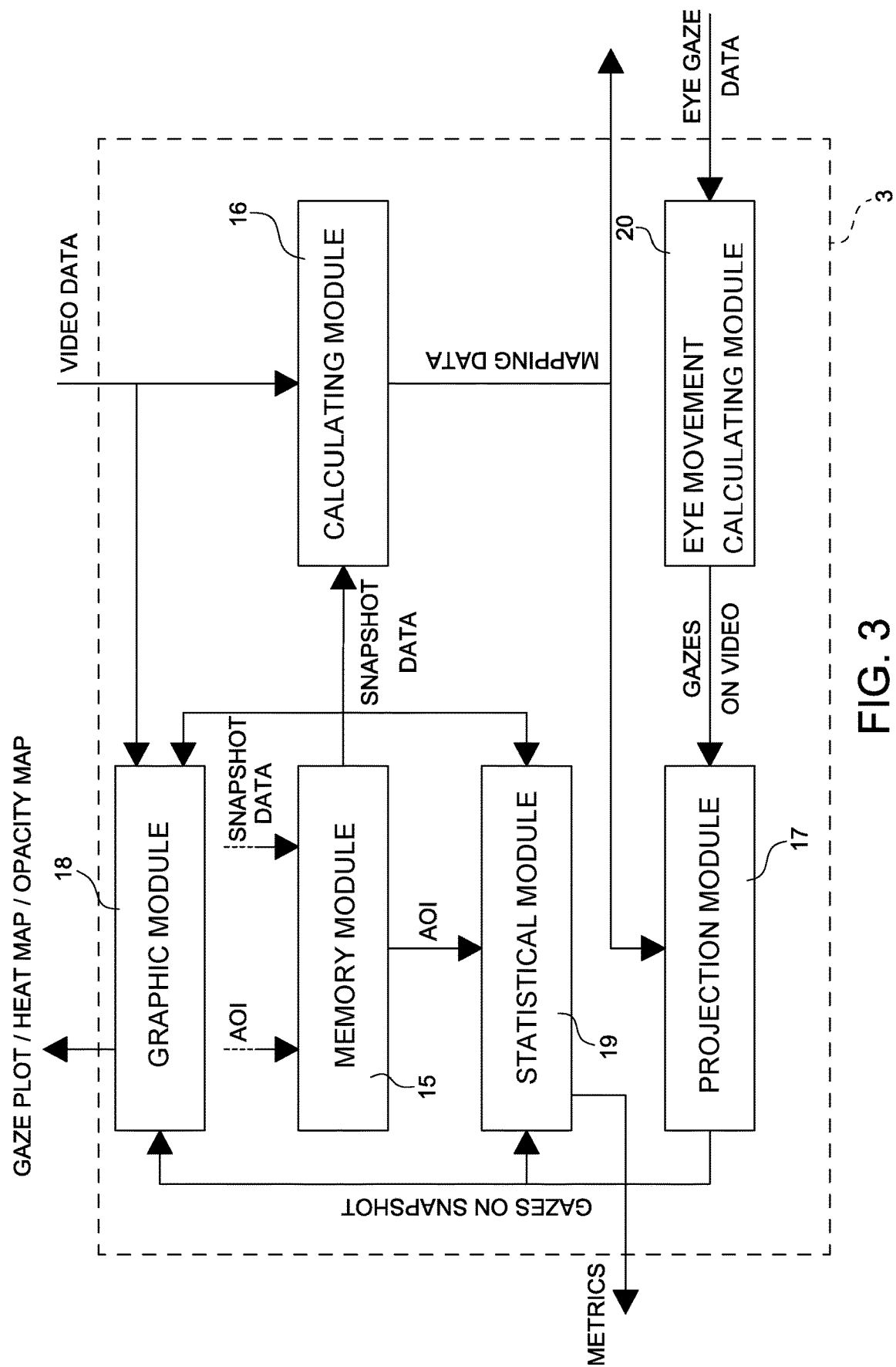
FIG. 3 is a schematic block representation of a further detail of FIG. 1.

FIG. 3 shows a block diagram concerning the control device 3.

The control device 3 comprises a memory module 15 and a calculating module 16.

The memory module 15 stores the reference image 6 of the environment to be mapped 8 and the items of information connected thereto (SNAPSHOT DATA), which comprise, for example, type of markers 10, specific arrangement of the cell 11, etc., as well as other items of information, such as for example the predefined area of interest (AOI).

The calculating module 16 is configured to receive the video sequence (VIDEO-DATA) detected by the video camera 2, in which the environment to be mapped 8 is at least partly framed, and to identify, in at least one frame of the video sequence, one or more cells 11 being part of the specific arrangement of the markers 10 of the reference image 6 contained in the data coming from the memory module 15 (SNAPSHOT DATA). As discussed more in detail below, the calculating module 16 is configured to determine, starting from the video sequence (VIDEO-DATA) detected by the video camera 2 and starting from the data coming from the memory module 15 (SNAPSHOT DATA), the mapping data (MAPPING DATA).

The control device 3 can optionally comprise a projection module 17 and/or a graphic module 18 and/or a statistical module 19, which are interfaced with the memory module 15 and/or with calculating module 16 and which will be described more in detail below.

Figure 4:
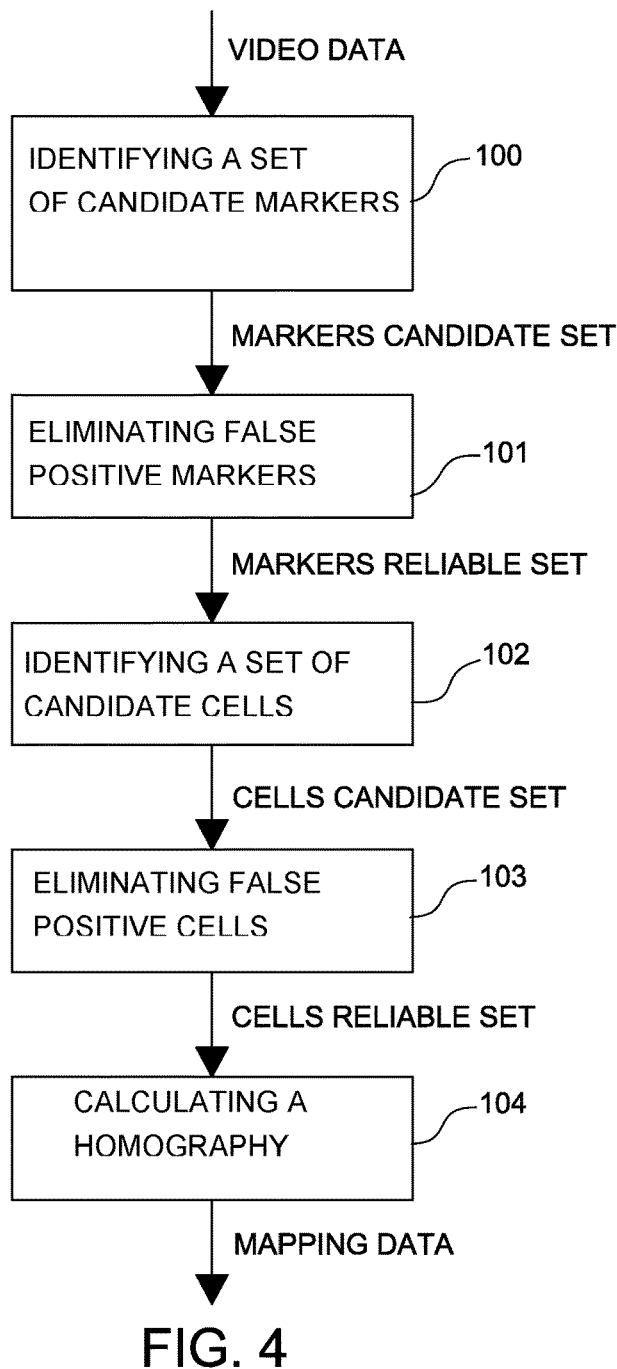
FIG. 4 is a schematic flowchart concerning a portion of the mapping method according to the invention.

With reference to FIG. 4, the calculating module 16 is configured to:
- identify (step 100), in at least one frame of the video sequence VIDEO DATA, a set of candidate markers MARKERS CANDIDATE SET;
- eliminate (step 101) from the set of markers MARKERS CANDIDATE SET the possible false positive candidate markers MFP so as to obtain a reliable set of candidate markers MARKERS RELIABLE SET;
- identify (step 102) all the combinations of candidate markers of the reliable set MARKERS RELIABLE SET associable to a cell 11 of the specific arrangement of the reference image 6 so as to obtain a set of candidate cells CANDIDATE CELLS SET;
- eliminate (step 103) from the set of candidate cells CANDIDATE CELLS SET the possible false positive cells CFP so as to obtain a reliable set of candidate cells CELLS RELIABLE SET; and
- calculate (step 104), starting from the reliable set of candidate cells CELLS RELIABLE SET and starting from the data SNAPSHOT DATA coming from the memory module 15, a homographhy (MAPPING DATA) capable of transforming the coordinates of the cells of the reliable set of cells CELLS RELIABLE SET acquired with a given perspective into coordinates representable in the perspective of the reference image 6 and vice versa. Hereinafter, by homography we mean a relation between points of two spaces, so that each point of a space corresponds to one single point of the second space. This relation is normally expressed by means of a matrix (called homography matrix) or a system of equations.

In particular, the step of identifying, in at least one frame of the video sequence VIDEO-DATA, a set of candidate markers MARKERS CANDIDATE SET comprises detecting all the elements associable with a marker and considering them as part of the set of candidate markers MARKERS CANDIDATE SET.

The step of eliminating false positives (step 101) takes place by means of the evaluation of some parameters of the candidate markers that are part of the set of candidate markers MARKERS CANDIDATE SET.

In the non-limiting embodiment shown and disclosed herein, wherein the markers 10 are circular and have different colours, the elimination step is based on the evaluation of the area of the candidate markers and/or of the brightness of the candidate markers and/or of the circularity of the candidate markers and/or of the inertial moment of the candidate markers and/or of the convexity of the candidate markers and/or of the colour of the candidate markers and/or on the basis of a reference dataset of false positives already classified.

For example, the reference dataset of the false positives can be defined thanks to automatic learning algorithms and/or can be defined based on experimental data.

Figure 5:
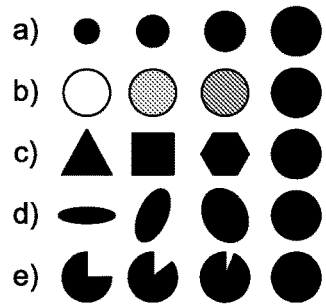
FIG. 5 is a schematic representation of a step of the mapping method according to the invention.

FIG. 5 shows some examples of the parameters on which the false positive elimination step (step 101) is based.

Point a) shows candidate markers with areas of different dimensions.

Point b) shows candidate markers with different brightnesses, wherein brightness means the intensity of the centre of the binary image of the candidate marker.

Point c) shows candidate markers with different circularity indexes.

Point d) shows candidate markers with different indexes of inertia, wherein inertia means the degree of dispersion of all the pixels belonging to the candidate marker around its centre of mass.

Point e) shows candidate markers with different convexity indexes.

The evaluation of the colour of the candidate markers is preferably based on the space-LAB colour coordinates. The space-LAB colour coordinates are three: a, b, L. The evaluation of the colour of the candidate markers, however, is preferably carried out by detecting the sole coordinates a, b of the candidate markers, which are compared with acceptable intervals of coordinates a, b starting from the colours assigned to the markers 10.

Obviously, as already mentioned above, the items of information concerning the colours assigned to the markers 10 are contained in the data SNAPSHOT DATA coming from the memory module 15.

In this way, the coordinate L, depending on the brightness, is not compared. By so doing, it is possible to avoid eliminating candidate markers having the colour of the markers 10, but a different brightness (a parameter that excessively depends on the conditions of detection of the sequence of images).

Alternatively, the colour of the markers 10 is recognized in an automatic manner by a suitable colour-classification algorithm.

At the end of the elimination step (step 101) there is a reliable set of candidate markers MARKERS RELIABLE SET.

The step of identifying (step 102) a set of candidate cells CELLS CANDIDATE SET involves detecting, starting from the markers that are part of the reliable set of candidate markers MARKERS RELIABLE SET, combinations of the candidate markers that can be associated with one of the cells 11 that are part of the specific arrangement in the reference image 6.

In the non-limiting embodiment shown and disclosed herein, the cells 11 that are part of the specific arrangement in the reference image 6 are quadrangular. Therefore, the candidate cells are formed by candidate markers arranged at the vertexes of quadrilaterals.

Once all the candidate cells have been identified, the step of eliminating false positive cells (step 103) substantially takes place in four steps.

The first step involves eliminating all the candidate cells that do not have at least one of the combinations of markers 10 of the cells 11.

In other words, the candidate cells are all those cells formed by candidate markers having an arrangement and colours that are identical to one of the specific combinations defining the cells 11 of the reference image 6.

The second step involves eliminating the candidate cells that represent projections of the cells 11 deriving from a hypothetical non-plausible and non-realistic framing. The cells, when deemed to be false positive, can generate non-plausible projections, i.e. projections that cannot derive from an actual framing. These cells can be eliminated a priori.

The third step involves eliminating the candidate cells that have an ACCAND/AMCAND ratio (cell area/area of the markers defining the candidate cell) that does not correspond to the $AC_{SNAPSHOT}/AM_{SNAPSHOT}$ ratio (cell area/area of the markers of the cell 11 of the specific arrangement in the reference image 6 having the same combination of markers as the candidate cell).

The fourth step involves calculating a homography starting from the data of all the candidate cells.

If the homography calculated by so doing corresponds to a plausible projection of the specific arrangement of the reference image 6, the candidate cells are considers as reliable.

If the homography does not correspond to a plausible projection of the specific arrangement of the reference image 6, at least some of the candidate cells are eliminated.

At the end of the four cell selection steps, there is a reliable set of cells CELLS RELIABLE SET.

Starting from the reliable set of candidate cells CELLS RELIABLE SET and starting from the data SNAPSHOT DATA coming from the memory module 15, the method comprises calculating, for at least some frames of the video sequence (VIDEO DATA), a homography (MAPPING DATA) capable of transforming the coordinates of the cells of the reliable set of cells CELLS RELIABLE SET acquired with a given perspective into coordinates representable in the perspective of the reference image 6 and vice versa.

In other words, the method comprises calculating a homography capable of obtaining a perspective transformation of the coordinated acquired by means of the sequence of images into coordinates representable in the reference image or, vice versa, a homography capable of obtaining a perspective transformation of the coordinates in the reference image into coordinates representable in the sequence of images.

The homography is calculated, as already mentioned above, for at least some of the frames of the video sequence VIDEO DATA.

The method according to the invention preferably comprises calculating at least one homography of at least one frame and determining the homographies of the remaining frames preferably through computer vision algorithms, such as for example "optical flow" algorithms, starting from the nomography and the images of the frames or through interpolation algorithms.

Sometimes, on the other hand, it is preferable to calculate a plurality of homographies and obtain, by means of the methods described above, the non-calculable homographies comprised between calculable homographies.

The homographies obtained by so doing define the mapping of the environment to be monitored (MAPPING DATA). These matrices can be used for the most varied applications.

In the non-limiting example disclosed and shown herein, the mapping data MAPPING DATA is preferably supplied to a projection module 17, which is configured to combine the mapping data MAPPING DATA coming from the calculating module 16 with possible data concerning the eye movement of the user looking, at least partly, at the environment to be mapped 8. The data concerning the eye movement of the user are detected by means of an eye tracking device 30 (schematically shown in FIG. 1 as part of the glasses 4) and connected to a respective eye movement calculating module 20 of the control device 3.

The eye tracking device 30 detects data concerning the eye movement of the user who is looking, at least partly, at the environment to be mapped 8 during the acquisition of the video sequence, whereas the eye movement calculating module 20 processes the data acquired by the eye tracking device 30 and sends the coordinates of the gaze on the video sequence GAZES ON VIDEO to the projection module 17.

According to a variant which is not shown herein, the eye movement calculating module 20 is built-in in the eye tracking device 30 and is not part of the control device 3. The projection module 17 is configured to process the coordinates of the gaze GAZES ON VIDEO coming from the eye movement calculating module 20 based on the homographies (MAPPING DATA) determined by the calculating module 16. In this way, the projection module 17 calculates the gaze point coordinates on the reference image 6 GAZES ON SNAPSHOT.

The control device 3 can optionally comprise, in addition, a graphic module 18, which is configured to represent the cells 11 identified by the calculating module 16 on the video sequence and/or on the reference image 6 and, if necessary, to also display on the reference image 6 the gaze coordinates GAZES ON VIDEO coming from the eye movement calculating module 20.

The graphic module 18 is further configured to process the input data and, if necessary, to represent on the reference image heat maps (usually defined HEAT MAPS) and/or GAZE PLOTS (indicating the location of the samplings of the gaze points or of the fixations, the order of these samplings or fixations and the time spent looking) and/or GAZE OPACITY MAPS (maps displaying only the areas where the attention of the user is focused, whereas the remaining areas are masked or opaque).

The control device 3 can also optionally comprise a statistical module 19, which is configured to process the data coming from the projection module 17 (GAZES ON SNAPHOT) and the data coming from the memory module 15 (SNAPSHOT DATA, AOI) so as to provide a statistical processing of this data (METRICS) useful for different applications and evaluations.

The mapping method and system according to the invention advantageously allow for the mapping of a real environment to be monitored in a simple and reliable manner, starting from a video sequence detected in motion, even under conditions that determine the acquisition of low-quality images.

The mapping data (MAPPING DATA) obtained by means of the mapping method and system according to the invention can be used for a statistical processing (through the statistical module 19) and/or to permit the representation of significant data data and/or in applications (not described and shown herein) which involve interactions of the user with the mapped environments/elements.

All the steps of the method according to the invention are carried out in an automatic manner. This allows for a "real-time" mapping.

Besides, the method and the system according to the invention are sufficiently reliable and robust. For example, they are not affected by the acquisition of low-quality images, of partial images of the environment to be mapped, of occlusions of part of the environment to be mapped and are not affected by the framing angle of the acquired images.

Furthermore, the mapping data obtained by means of the method and the system according to the invention are accurate and capable of providing indications on the distance of acquisition of the sequence of images from the mapped environments/elements.

Finally, the system according to the invention is simple and economic, also thanks to the fact that it preferably uses passive markers (i.e. non-active markers, such as for example signal emitting markers) and does not require special maintenance.

Finally, it is clear that the mapping system and method described herein can be subject to changes and variations, without for this reason going beyond the scope of protection of the appended claims.

The invention claimed is:

1. Mapping method comprising the steps of:
positioning, in an environment to be mapped, a plurality of markers into a specific arrangement, the plurality of markers comprising a plurality of different types of artificial and passive markers;
defining boundaries of one or more cells based on the specific arrangement of combinations of the plurality of different types of markers in the plurality of markers;
acquiring and memorizing at least one reference image of an environment to be mapped containing the one or more cells defined by the specific arrangement of the plurality of markers;
detecting, by a moving video camera, a video sequence wherein the environment to be mapped is, at least in part, framed;
identifying, in at least one frame of the video sequence, the specific arrangement of markers of the reference image;
identifying, in the at least one frame of the video sequence, a reliable set of one or more candidate cells corresponding to the specific arrangement of markers of the reference image;
calculating, based on data regarding the reliable set of one or more candidate cells identified in the at least one frame of the video sequence, at least one homography for a perspective transformation of coordinates acquired in the video sequence into coordinates in the reference image and vice versa.

2. Method according to claim 1, wherein candidate cells are identified in the at least one frame of the video sequence as having combinations of the plurality of markers that are identical to the one or more cells in the reference image; and
wherein at least one of the candidate cells are eliminated from the at least one frame of the video sequence to identify the reliable set of candidate cells in response to:

determining the at least one of the candidate cells in the at least one frame of the video sequence generates a non-plausible projection, or determining that a ratio between an area of the at least one of the candidate cells and an area of the combination of the plurality of markers defining the at least one candidate cell in the at least one frame of the video sequence is different than a ratio between an area of the one or more cells in the reference image that have an identical combination of markers as the candidate cell and an area of the combination of the plurality of markers defining the one or more cells in the reference image.

3. Method according to claim 1, wherein the plurality of markers comprises markers having circular shape.

4. Method according to claim 1, wherein the plurality of markers comprises markers having a number of different colors equal to the type-number.

5. Method according to claim 1, wherein identifying in at least one frame of the video sequence one or more cells comprises at least:
identifying in at least one frame of the video sequence a set of candidate markers;
eliminating from the plurality of markers false positive potential candidate markers so as to obtain a reliable set of candidate markers;
identifying all combinations of the candidate markers of the reliable set associable to a cell of the specific arrangement of the reference image so as to obtain a set of candidate cells;
eliminating from the set of candidate cells the false positive potential cells so as to obtain a reliable set of candidate cells.

6. Method according to claim 5, wherein the step of eliminating from the set of candidate markers the false-positive potential candidate markers comprises eliminating the candidate markers based on a valuation of an area of the candidate markers and/or of a brightness of the candidate markers and/or of a circularity of the candidate markers and/or of an inertial moment of the candidate markers and/or of a convexity of the candidate markers and/or of a color of the candidate markers and/or based on a reference dataset of false positives already classified.

7. Method according to claim 1, comprising the step of detecting, simultaneously to a video sequence acquisition, at least a data sequence regarding eyes movement of a user looking, at least in part, at the environment to be mapped by means an eye tracking device.

8. Method according to claim 7, comprising the step of processing the data sequence acquired by the eye tracking device so as to obtain gaze point coordinates on the video sequence.

9. Method according to claim 8, comprising the step of processing the gaze point coordinates on the video sequence based on the homography so as to obtain reference gaze point coordinates on the reference image.

10. Method according to claim 1, comprising the step of positioning, in the environment to be mapped, a plurality of markers organized in cells according to a specific configuration.

11. Method according to claim 1, wherein the one or more cells are closed geometric shapes defined based on the spatial arrangement of the plurality of markers.

12. Method according to claim 11, wherein the plurality of markers define vertices of the one or more cells,
wherein the specific arrangement of the plurality of markers is quadrangle, and
wherein the one or more cells are quadrilaterals having boundaries defined by a combination of the plurality of markers.

13. Mapping system comprising:
a moving video camera, configured to detect a video sequence wherein an environment to be mapped is, at least in part, framed;
a plurality of markers arranged in the environment to be mapped and organized according to a specific arrangement, the plurality of markers comprising a plurality of different types of artificial and passive markers equal to a type-number;
a control device provided with:
a memory module configured to memorize at least one reference image of the environment to be mapped containing the specific arrangement of the plurality of markers organized in cells;
a calculating module configured to:
define boundaries of one or more cells based on the specific arrangement of combinations of the plurality of different types of markers in the plurality of markers;
identify in at least one frame of the video sequence the specific arrangement of markers of the reference image,
identify, in the at least one frame of the video sequence, a reliable set of one or more cells corresponding to the specific arrangement of the markers, and
calculate, based on data regarding the reliable set of one or more candidate cells identified in the at least one frame of the video sequence, at least one homography for a perspective transformation of coordinates acquired in the video sequence into coordinates in the reference image and vice versa.

14. System according to claim 13, wherein the type-number of different types of markers is equal to at least two.

15. System according to claim 13, wherein the plurality of markers comprises markers having circular shape.

16. System according to claim 13, wherein the plurality of markers comprises markers having a number of different colors equal to the type-number.

17. System according to claim 13, wherein the calculating module is configured to:
identify in at least one frame of the video sequence a set of candidate markers;
eliminate from the set of candidate markers false positive potential candidate markers so as to obtain a reliable set of candidate markers;
identify all combinations of the candidate markers of the reliable set associable to a cell of the specific arrangement of the reference image so as to obtain a set of candidate cells;
eliminate from the set of candidate cells the false positive potential cells so as to obtain a reliable set of candidate cells.

18. System according to claim 17, wherein the calculating module is configured to eliminate from the set of candidate markers the false positive potential candidate markers based on a valuation of an area of the candidate markers and/or of a brightness of the candidate markers and/or of a circularity of the candidate markers and/or of an inertial moment of the candidate markers and/or of a convexity of the candidate markers and/or of a color of the candidate markers and/or based on a reference dataset of false positives already classified.

19. System according to claim 13, comprising an eye tracking device configured to detect, simultaneously to a video sequence acquisition, at least a data sequence regarding eyes movement of a user looking, at least in part, at the environment to be mapped.

20. System according to claim 19, comprising an eye movement calculating module configured to process the data sequence acquired by the eye tracking device so as to obtain gaze point coordinates on the video sequence.

21. System according to claim 20, comprising a projection module configured to process the gaze point coordinates on the video sequence based on the homography so as to obtain reference gaze point coordinates on the reference image.

22. System according to claim 13, wherein candidate cells are identified in the at least one frame of the video sequence as having combinations of the plurality of markers that are identical to the one or more cells in the reference image; and
   wherein at least one of the candidate cells are eliminated from the at least one frame of the video sequence to identify the reliable set of candidate cells in response to:
      determining the at least one of the candidate cells in the at least one frame of the video sequence generates a non-plausible projection, or
      determining that a ratio between an area of the at least one of the candidate cells and an area of the combination of the plurality of markers defining the at least one candidate cell in the at least one frame of the video sequence is different than a ratio between an area of the one or more cells in the reference image that have an identical combination of markers as the candidate cell and an area of the combination of the plurality of markers defining the one or more cells in the reference image.

* * * * *